(12) United States Patent
Matsushima

(10) Patent No.: US 10,759,317 B2
(45) Date of Patent: Sep. 1, 2020

(54) VEHICLE SEAT

(71) Applicant: TOYOTA BOSHOKU KABUSHIKI KAISHA, Aichi-ken (JP)

(72) Inventor: Iwao Matsushima, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/635,983

(22) Filed: Jun. 28, 2017

(65) Prior Publication Data

US 2018/0009345 A1 Jan. 11, 2018

(30) Foreign Application Priority Data

Jul. 6, 2016 (JP) ................................. 2016-134345

(51) Int. Cl.
*B60N 2/809* (2018.01)
*B60N 2/894* (2018.01)
*B60N 2/821* (2018.01)
*B60N 2/20* (2006.01)
*B60N 2/22* (2006.01)

(52) U.S. Cl.
CPC .............. *B60N 2/809* (2018.02); *B60N 2/20* (2013.01); *B60N 2/22* (2013.01); *B60N 2/821* (2018.02); *B60N 2/894* (2018.02)

(58) Field of Classification Search
CPC ........ B60N 2/806; B60N 2/829; B60N 2/809; B60N 2/20; B60N 2/22
See application file for complete search history.

(56) References Cited

U.S. PATENT DOCUMENTS

| 10,035,442 | B2* | 7/2018 | Kondrad | B60N 2/829 |
| 2014/0368008 | A1* | 12/2014 | Mizobata | B60N 2/809 |
| | | | | 297/216.12 |
| 2015/0130248 | A1* | 5/2015 | Line | B60N 2/4829 |
| | | | | 297/410 |

FOREIGN PATENT DOCUMENTS

| JP | 3-85949 U | 8/1991 |
| JP | 2003-93191 | 4/2003 |
| JP | 2012-35670 A | 2/2012 |

OTHER PUBLICATIONS

Office Action issued in JP 2016-134345 and partial translation thereof, dated Jan. 14, 2020.

\* cited by examiner

*Primary Examiner* — Philip F Gabler
(74) *Attorney, Agent, or Firm* — Greenblum & Bernstein, P.L.C.

(57) ABSTRACT

A vehicle seat includes a seat cushion, a seatback, and a headrest. At least one of the seat cushion, the seatback, and the headrest includes a fixed part and a movable part. The fixed part and the movable part that is mounted so as to be movable relative to the fixed part are provided adjacent to each other. A border between the movable part and the fixed part is exposed to an outside of the seat. A movable-side edge of the movable part and a fixed-side edge of the fixed part are disposed adjacent to each other along a direction of movement of the movable part so as to form at least a part of the border exposed to the outside of the seat. The movable part moves relative to the fixed part while keeping a constant clearance between the movable-side edge and the fixed-side edge.

4 Claims, 13 Drawing Sheets

VEHICLE SEAT

INCORPORATION BY REFERENCE

The disclosure of Japanese Patent Application No. 2016-134345 filed on Jul. 6, 2016 including the specification, drawings and abstract is incorporated herein by reference in its entirety.

BACKGROUND

1. Technical Field

The present disclosure relates to a vehicle seat provided with a movable part and a fixed part that are mounted adjacent to each other.

2. Description of Related Art

A vehicle seat including a seatback and a headrest that is mounted so as to be able to move up and down relative to the seatback is publicly known as a typical vehicle seat. For example, the vehicle seat of Japanese Patent Application Publication No. 2003-93191 has a seatback in an upright position disposed on the rear side of a seat cushion, and a headrest disposed on the upper side of this seatback. The headrest is a pillow-shaped member that can support the head of an occupant, and has a pair of headrest stays protruding from a lower surface of the headrest. The seatback is provided with a pair of headrest supports and a lifter that moves the headrest stays up and down. The pair of headrest supports are tubular members into which the corresponding headrest stays can be inserted, and are disposed so as to be exposed in an upper surface of the seatback. According to the publicly-known technology, the headrest is mounted on the upper side of the seatback as the headrest stays are inserted into the corresponding headrest supports. To move the headrest up according to a difference in physical size of the occupant, the headrest stays are moved up by the lifter and pulled out to an appropriate extent from the headrest supports.

In the field of this type of vehicle seat, there is a demand for making appropriate changes to the external design of a seat from the viewpoint of enhancing the design appeal of the seat etc. However, being the members that support the headrest stays in the publicly-known technology, the headrest supports are subject to certain restrictions on the external design, and it is difficult to make a major design change thereto.

SUMMARY

One solution is to mount a cover body on the headrest and cover the headrest supports with this cover body. The cover body is mounted, for example, on the seatback side so as to be movable relative to the headrest. By elaborating the external design of the cover body, the appearance of the seat can be changed regardless of the headrest.

In the above configuration, as the cover body and the headrest are disposed adjacent to each other, a partition line that is the border therebetween may be exposed to the outside of the seat. From the viewpoint of maintaining the design appeal of the seat, it should be avoided as much as possible that the width of this partition line increases extremely when the headrest moves up relative to the cover body that is mounted on the seatback side. For example, in the case where the partition line between the headrest and the cover body is formed only in a front-rear direction or an inclination direction that is extremely different from a direction of up-and-down movement of the headrest, the width of the partition line increases extremely in an up-down direction as the headrest moves up. This makes it necessary to take measures to obscure the partition line between the headrest and the cover body, but taking such measures may excessively complicate the seat configuration. The present disclosure provides a vehicle seat where the movable part and the fixed part can be adjacent to each other while securing good performance.

A vehicle seat of an aspect of the present disclosure includes a seat cushion, a seatback, and a headrest. At least one of the seat cushion, the seatback, and the headrest includes a fixed part and a movable part. The fixed part and the movable part that is mounted so as to be movable relative to the fixed part are provided adjacent to each other, and a border between the movable part and the fixed part is exposed to the outside of the seat. A movable-side edge of the movable part and a fixed-side edge of the fixed part are disposed adjacent to each other along a direction of movement of the movable part so as to form at least a part of the border exposed to the outside of the scat. The movable part moves relative to the fixed part while keeping a constant clearance between the movable-side edge and the fixed-side edge. In this aspect, the movable-side edge and the fixed-side edge forming the border between the movable part and the fixed part are disposed along the direction of movement of the movable part. The movable part moves relative to the fixed part while keeping a constant clearance between the movable-side edge and the fixed-side edge. Thus, this configuration prevents as much as possible an extreme difference from occurring in the appearance of the seat between before and after movement of the movable part.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
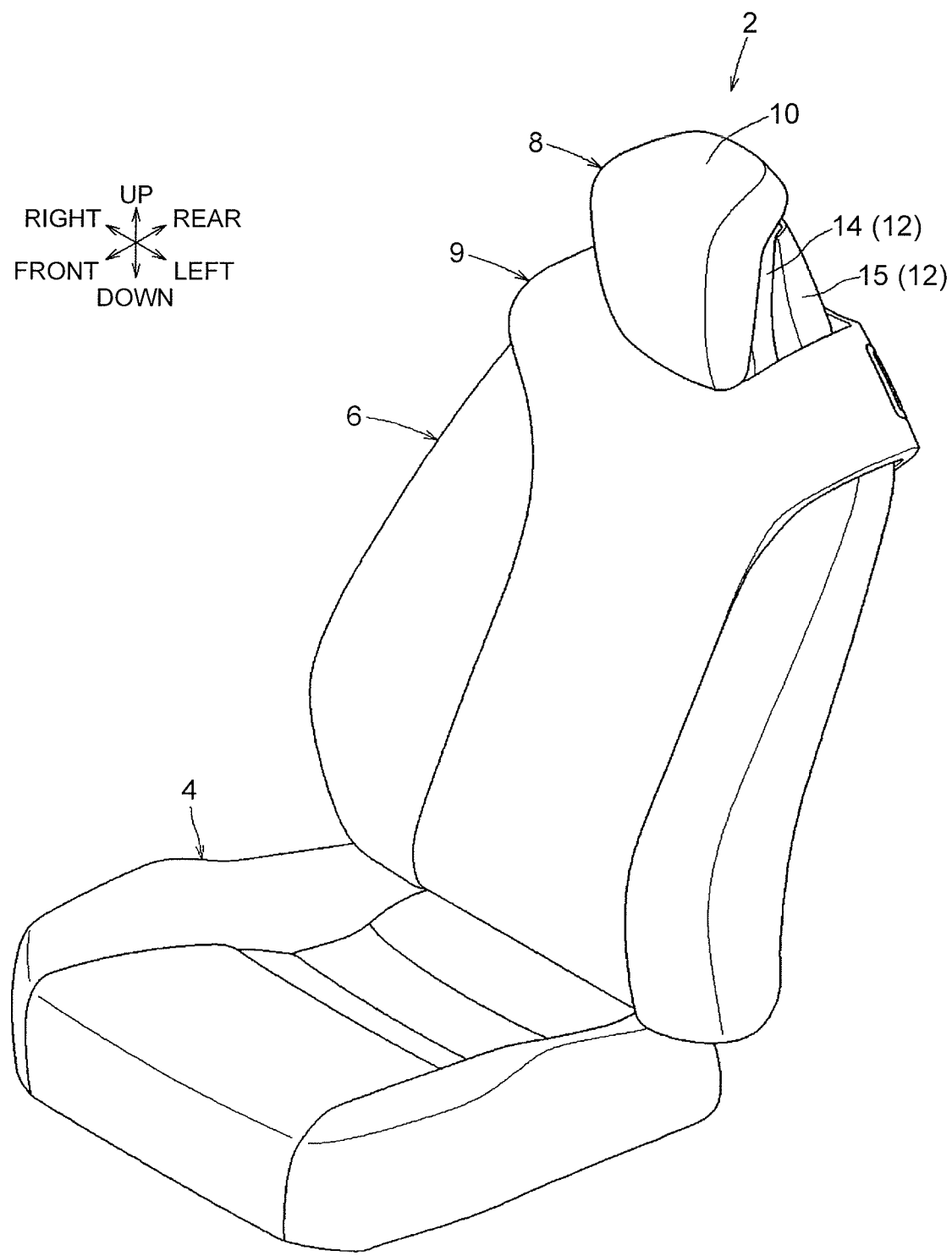
FIG. 1 is a perspective view of a vehicle seat.

An embodiment of the present disclosure will be described below with reference to FIG. 1 to FIG. 13. For convenience, arrows indicating a front-rear direction, a left-right direction, and an up-down direction of a vehicle seat may be appropriately indicated in these drawings. For convenience, a pad material of a movable part is omitted from the headrest shown in FIG. 12 and FIG. 13. A vehicle seat 2 of FIG. 1 has a seat cushion 4, a seatback 6, a headrest 8, and a support member 9. A lower part of the seatback 6 is coupled to a rear part of the seat cushion 4 so that the seatback 6 can be raised or reclined, and the support member 9 is mounted on a front surface of the seatback 6. The support member 9 is a mat material that is substantially Y-shaped in a front view and can elastically support an occupant, and the support member 9 is mounted from the upper side of shoulders of the seatback 6 so as to cover the front surface of the seatback 6.

Figure 2:
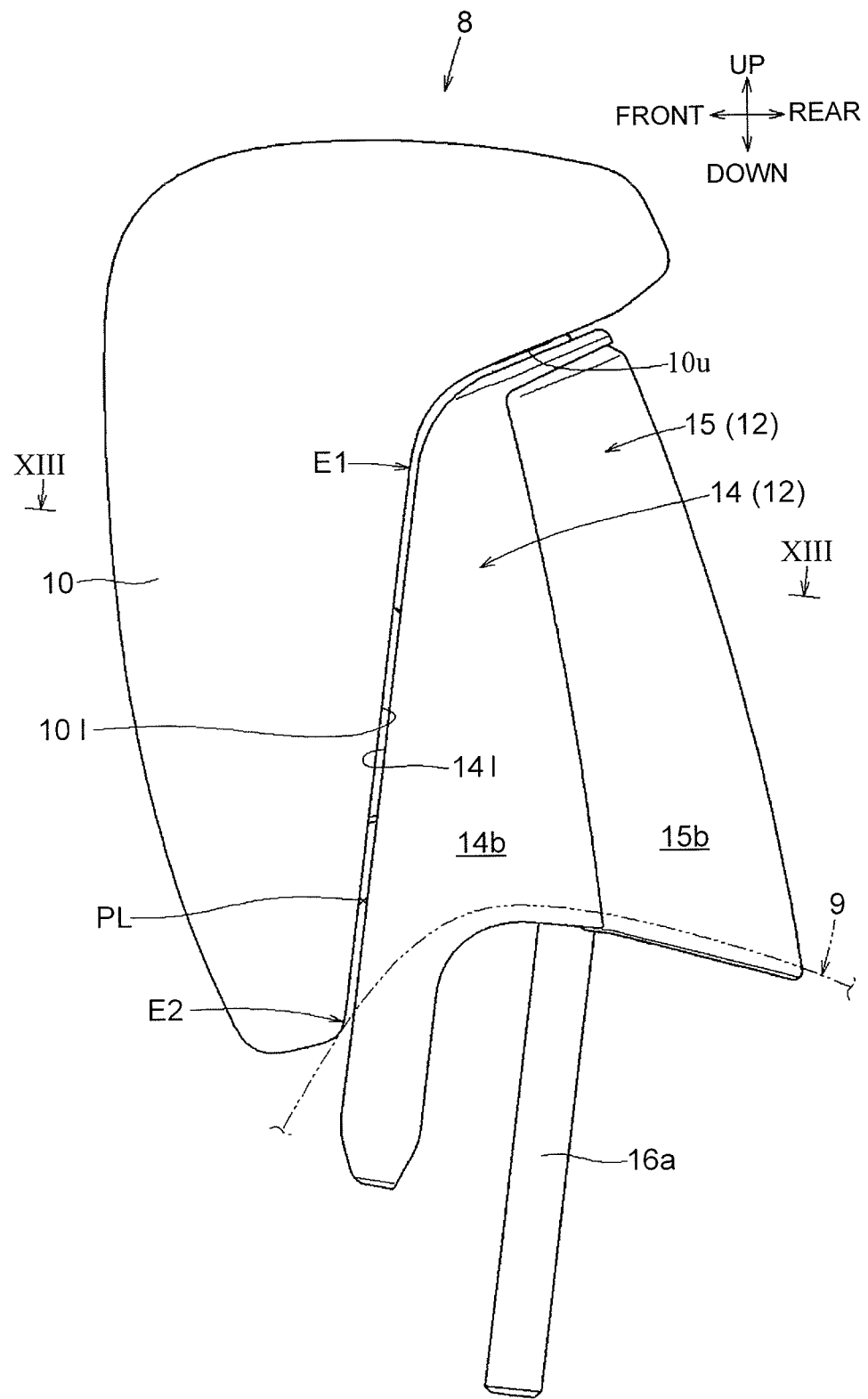
FIG. 2 is a side view of a headrest with a movable part moved down.
Figure 3:
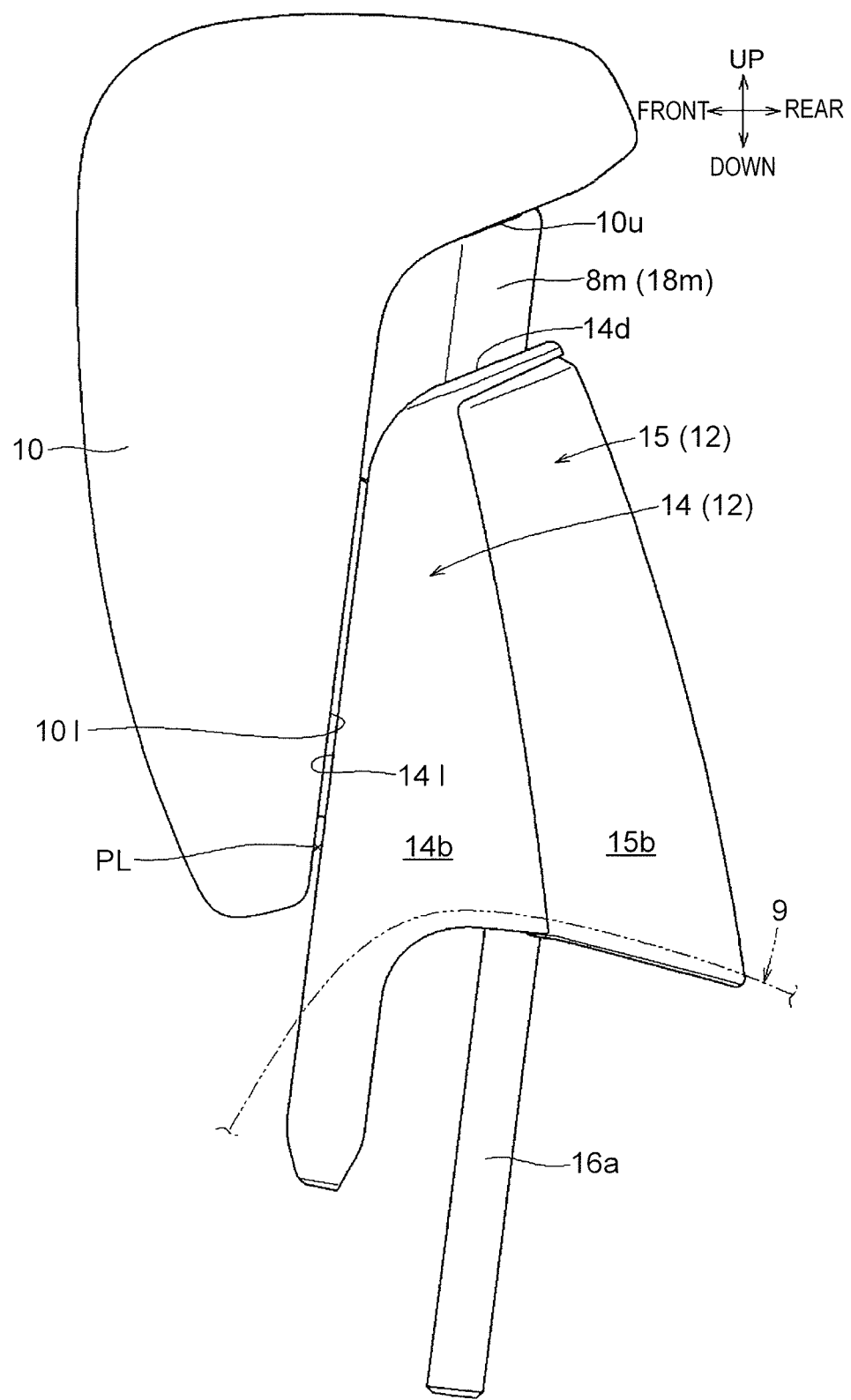
FIG. 3 is a side view of the headrest with the movable part moved up.

The headrest 8 that can support the head of an occupant is disposed on the upper side of the seatback 6 in an upright position. The headrest 8 is provided with the movable part 10 on the front side that is mounted so as to be able to move up and down relative to a fixed part 12 on the rear side (details of these parts will be described later). Referring to FIG. 2 and FIG. 3, the movable part 10 is disposed adjacent to a front cover body 14 (to be described later) that is provided on the fixed part 12, and a partition line PL forming a border between the movable part 10 and the front cover body 14 is exposed to the outside of the seat. The movable part 10 moves up and down relative to the front cover body 14. In this type of configuration, in view of the design appeal of the seat etc., no extreme difference should occur in the appearance of the seat between before and after movement of the movable part 10, and it is desirable that the movable part 10 and the fixed part 12 can be disposed adjacent to each other. Therefore, this embodiment employs the following configuration, which makes it possible to dispose the movable part 10 and the fixed part 12 of the headrest 8 adjacent to each other while securing good performance. Relevant components will be described in detail below.

Figure 4:
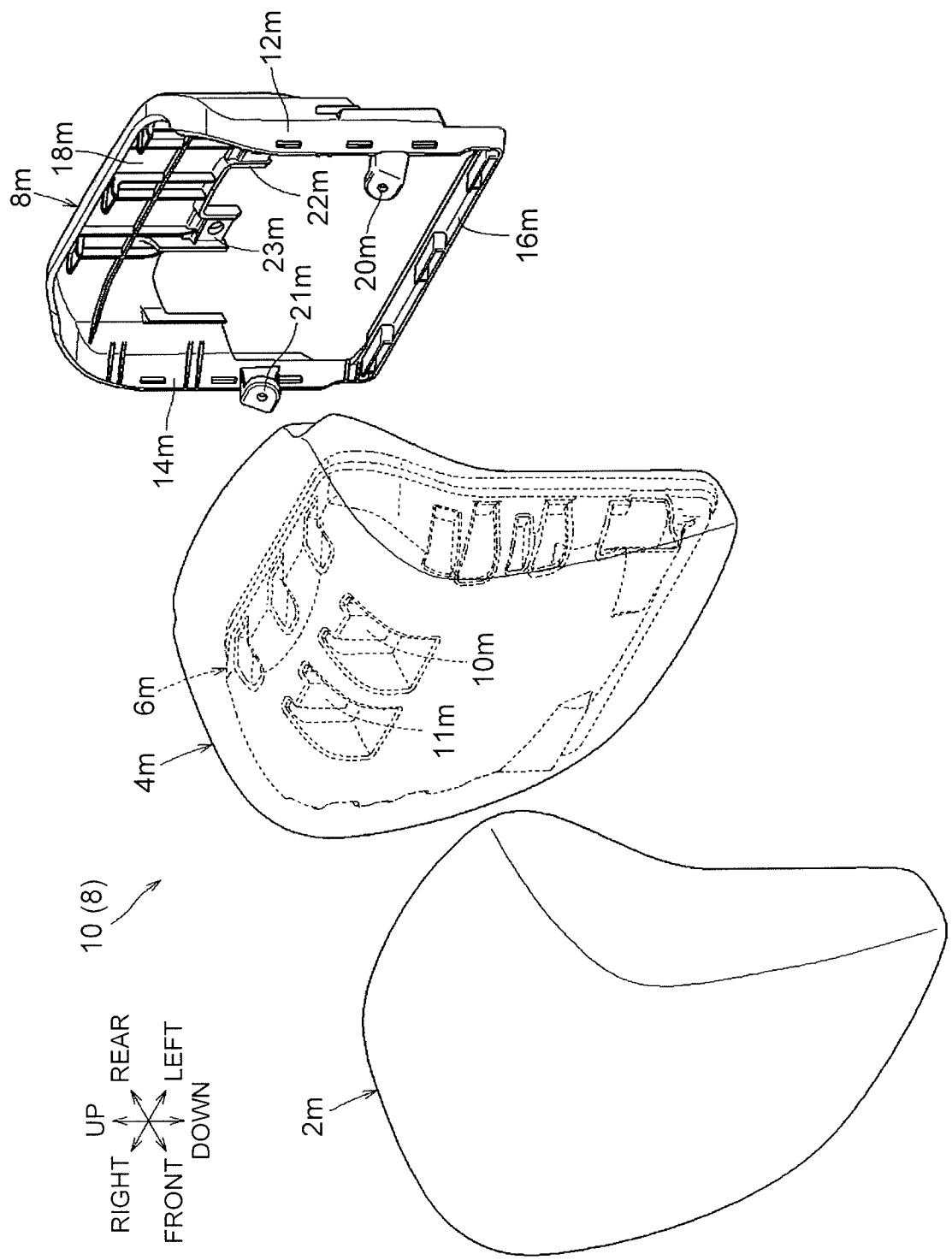
FIG. 4 is an exploded perspective view of the movable part.

The movable part 10 is a pillow-like member that can support the head of an occupant. Referring to FIG. 4, the movable part 10 has a skin 2m, a pad material 4m, an insert material 6m integral with the pad material 4m, and a bezel 8m mounted to the insert material 6m. Here, the skin 2m is a facing material that covers the seated side of the pad material 4m, and can be composed of, for example, a fabric (woven fabric, knitted fabric, nonwoven fabric) or a leather (natural leather, synthetic leather). The pad material 4m is a member that forms the external shape of the movable part 10, and can be made of a foamed resin, such as polyurethane foam (density: 10 kg/m$^3$ to 60 kg/m$^3$). The pad material 4m is substantially inverted L-shaped in a side view, and the upper side of the pad material 4m is bent toward the rear side. The insert material 6m is a plate material having a substantially rectangular shape in a front view, and is exposed in a rear surface of the pad material 4m. A pair of left and right mounting claws 10m, 11m protruding downward are provided in an upper part of the insert material 6m, and the mounting claws 10m, 11m can latch on an upper plate 13e of a mechanical section 13 (to be described later) shown in FIG. 6.

Figure 5:
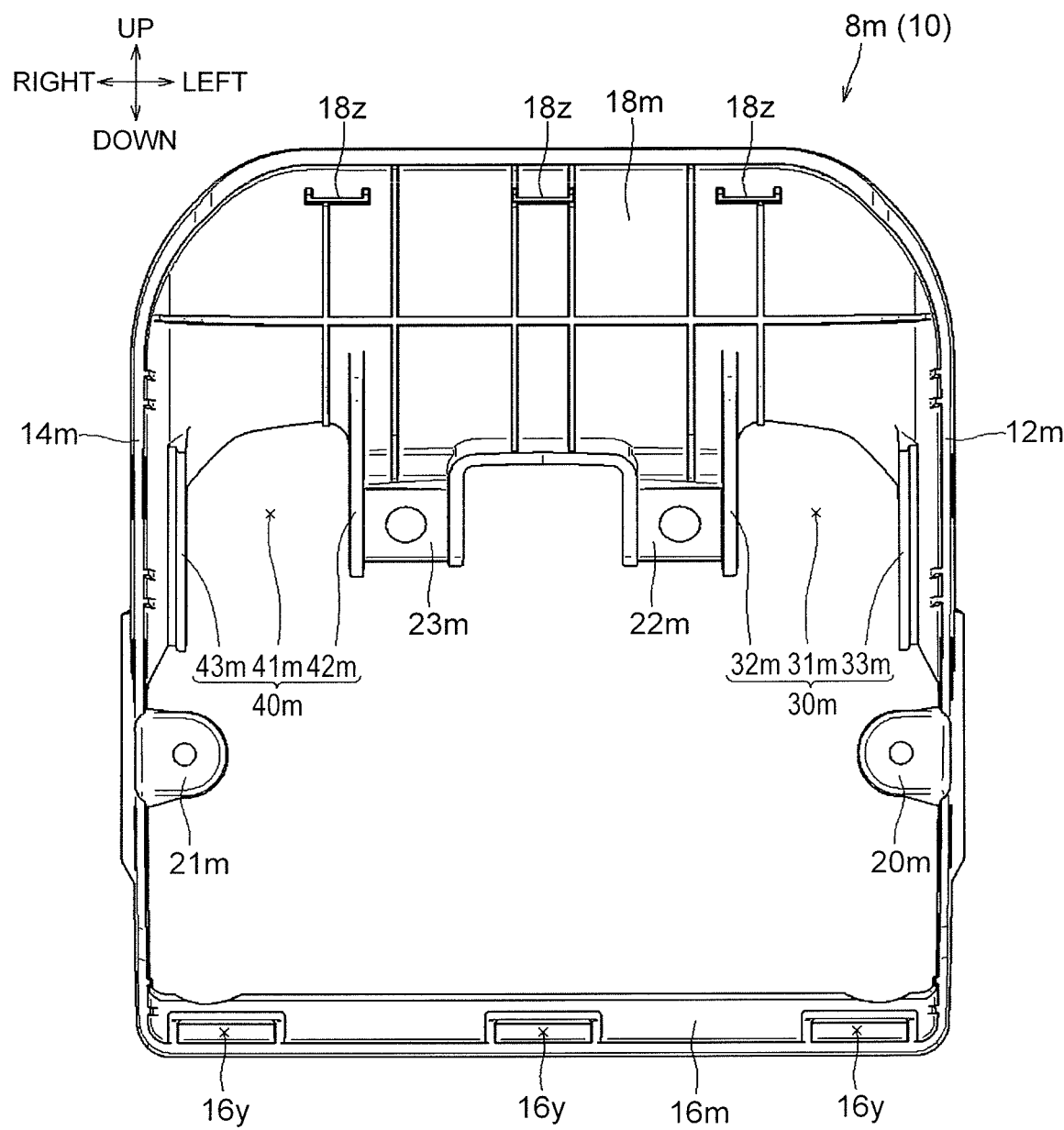
FIG. 5 is a front view of a bezel.

The bezel 8m is a frame-like member having a substantially rectangular shape in a front view. Referring to FIG. 5, the bezel 8m has a left frame part 12m, a right frame part 14m, a lower frame part 16m, an upper frame part 18m, and a pair of left and right rails 30m, 40m (to be described later). The left frame part 12m is a frame part that forms the left side of the bezel 8m, and the right frame part 14m is a frame part that forms the right side of the bezel 8m. On a front surface of the left frame part 12m (right frame part 14m), a fastening portion 20m (21m) that is substantially L-shaped and protrudes frontward is provided. The left and right fastening portions 20m, 21m are fixed to fastening seats (not shown) of the insert material 6m. Edges of the left frame part 12m and the right frame part 14m are mounted by being inserted into recesses 6x at left and right edges of the insert material 6m shown in FIG. 13.

Figure 12:
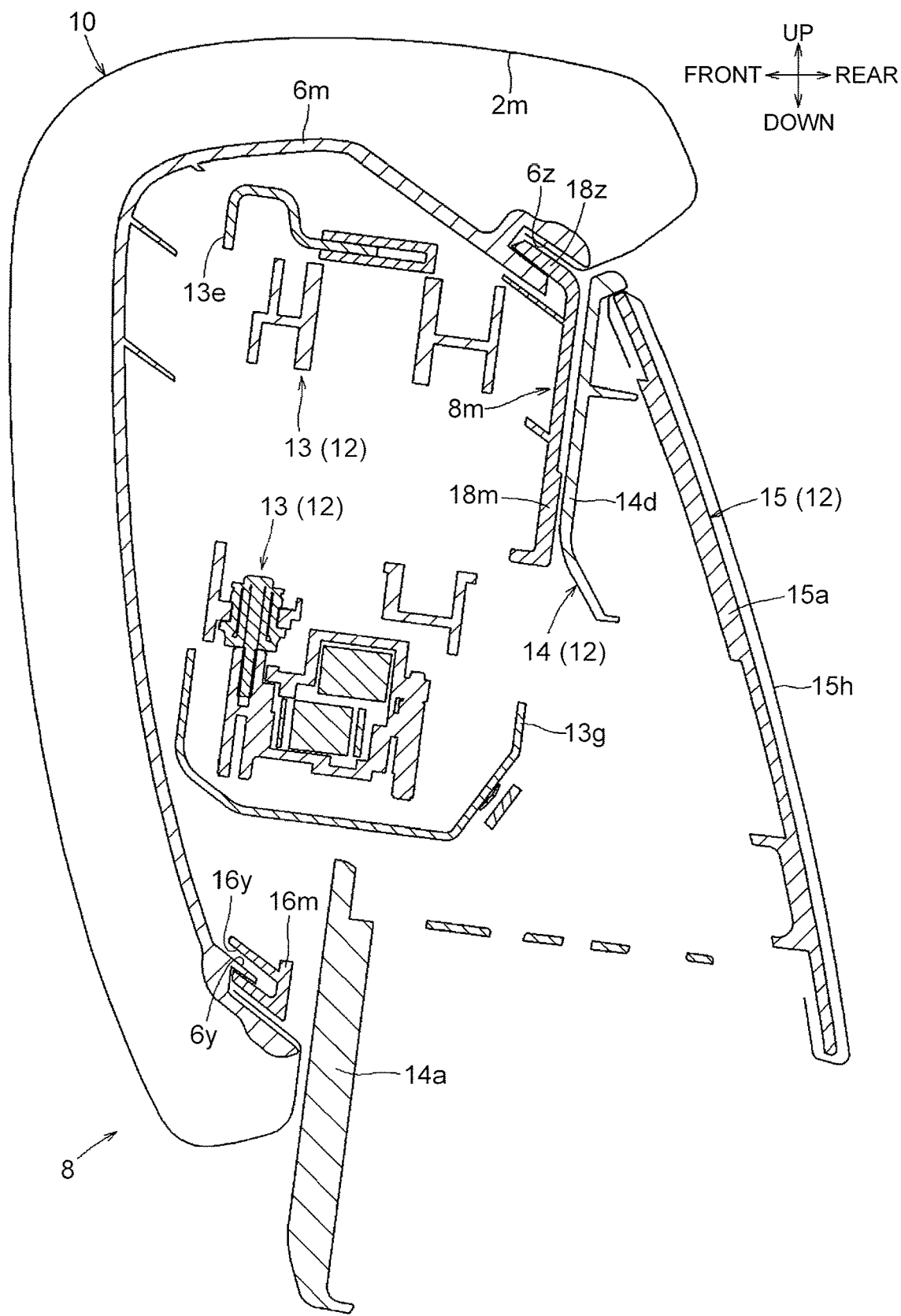
FIG. 12 is a longitudinal sectional view of the headrest at the center in a seat width direction.

Referring to FIG. 5, the lower frame part 16m is a frame part that is built across lower ends of the left frame part 12m and the right frame part 14m. The lower frame part 16m is provided with a plurality of mounting recesses 16y, and protrusions 6y at a lower edge of a rear end of the insert material 6m shown in FIG. 12 are mounted by being inserted into the mounting recesses 16y. The upper frame part 18m is a frame part that is built across upper ends of the left frame part 12m and the right frame part 14m. As shown in FIG. 4, the upper frame part 18m has a curved shape that is convex rearward. Referring to FIG. 5, the upper frame part 18m has a plurality of mounting protrusions 18z and a pair of left and right mounting plates 22m, 23m. The mounting protrusions 18z are mounted by being inserted into recesses 6z at an upper edge of the rear end of the insert material 6m shown in FIG. 12. The left and right mounting plates 22m, 23m are flat plate portions that have a substantially rectangular shape in a front view and protrude from a lower end of the upper frame part 18m, and can be fastened and fixed to a rear plate 13g of the mechanical section 13 (to be described later) shown in FIG. 6. When the movable part 10 is moved up as shown in FIG. 3, a rear surface of the upper frame part 18m is exposed to the outside of the seat. It is therefore desirable that the rear surface of the upper frame part 18m is a smooth curved surface in view of the design appeal of the seat.

Referring to FIG. 5, the pair of left and right rails 30m, 40m are formed at an appropriate interval respectively on the left and right sides in a front surface of the upper frame part 18m. The rails 30m, 40m are parts with which engaging portions 30, 40 of the front cover body 14 (to be described later) shown in FIG. 9 can be engaged. As the rails 30m, 40m have substantially the same basic configuration, only the left rail 30m will be described in detail as an example. Referring to FIG. 5, the left rail 30m has a pass-through 31m, an inner rail part 32m, and an outer rail part 33m. The pass-through 31m is a cutout that has a substantially rectangular shape and is open on the lower side, and is provided on the left side of the left mounting plate 22m. The inner rail part 32m is a part that has a shape of an upright wall and extends in the up-down direction, and protrudes frontward from the right side of the pass-through 31m. The outer rail part 33m is a part that has a shape of an upright wall and extends in the up-down direction, and protrudes frontward from the left side of the pass-through 31m. Similarly, the right rail 40m has a pass-through 41m provided on the right side of the right mounting plate 23m, an inner rail part 42m on the left side of the pass-through 41m, and an outer rail part 43m on the right side of the pass-through 41m.

The fixed part 12 is a part that moves the movable part 10 up and down according to the physical size of an occupant. Referring to FIG. 6 to FIG. 11, the fixed part 12 has the mechanical section 13, the front cover body 14, a rear cover body 15, a pair of left and right headrest stays 16a, 16b, and a retention plate 18. Both the headrest stays 16a, 16b are rod-like members that are bent in a crank shape in a side view, and are disposed respectively on the left side and the right side of the fixed part 12 in a seat width direction. The headrest stays 16a, 16b are fixed at the front side to the mechanical section 13 (to be described later) while extending upward, and these portions extending upward are used as guide pins 17a, 17b that guide movable units of the mechanical section 13 (to be described later).

Figure 6:
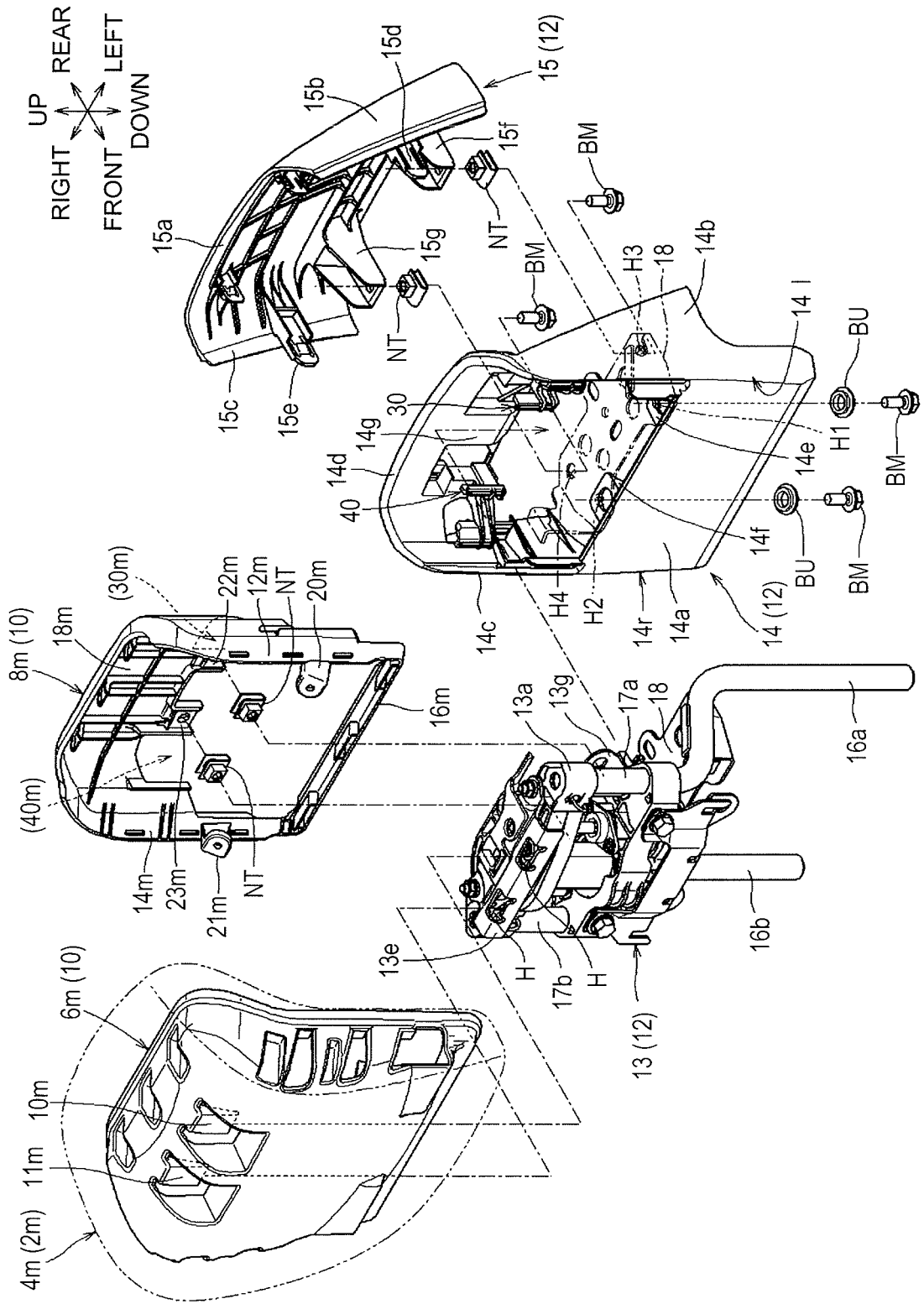
FIG. 6 is an exploded perspective view of a portion of the movable part and a fixed part.
Figure 10:
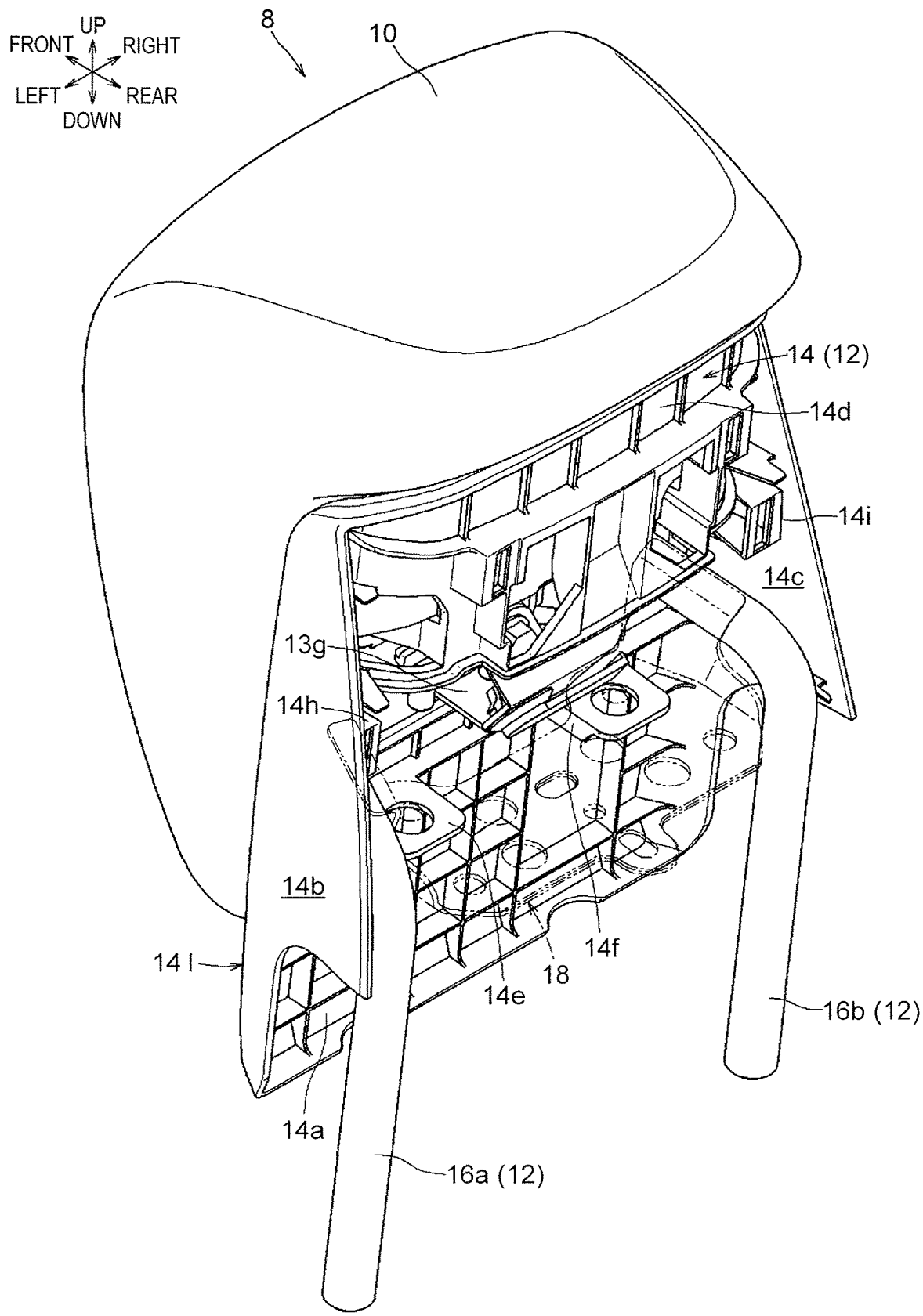
FIG. 10 is a perspective view of the headrest with a rear cover body removed.

Referring to FIG. 10, rear portions of the headrest stays 16a, 16b protrude rearward from a lower part of the mechanical section 13 and then bend downward. These portions of the headrest stays 16a, 16b extending downward are inserted into headrest supports (not shown) provided on the upper side of the seatback. Referring to FIG. 6, the retention plate 18 having a substantially rectangular shape in a top view is fixed by welding across portions of the pair of left and right headrest stays 16a, 16b extending rearward (in FIG. 6, the retention plate 18 in a state where the mechanical section is in place is indicated by the broken lines inside the front cover body 14). Referring to the part indicated by the broken lines in FIG. 6, a plurality of fastening holes H1 to H4 are provided in a front part and a rear part of the retention plate 18. The front cover body 14 (to be described later) can be fastened and fixed to the pair of fastening holes H1, H2 on the front side of the retention plate 18, and the rear cover body 15 (to be described later) can be fastened and fixed to the pair of fastening holes H3, H4 on the rear side of the retention plate 18.

Figure 7:
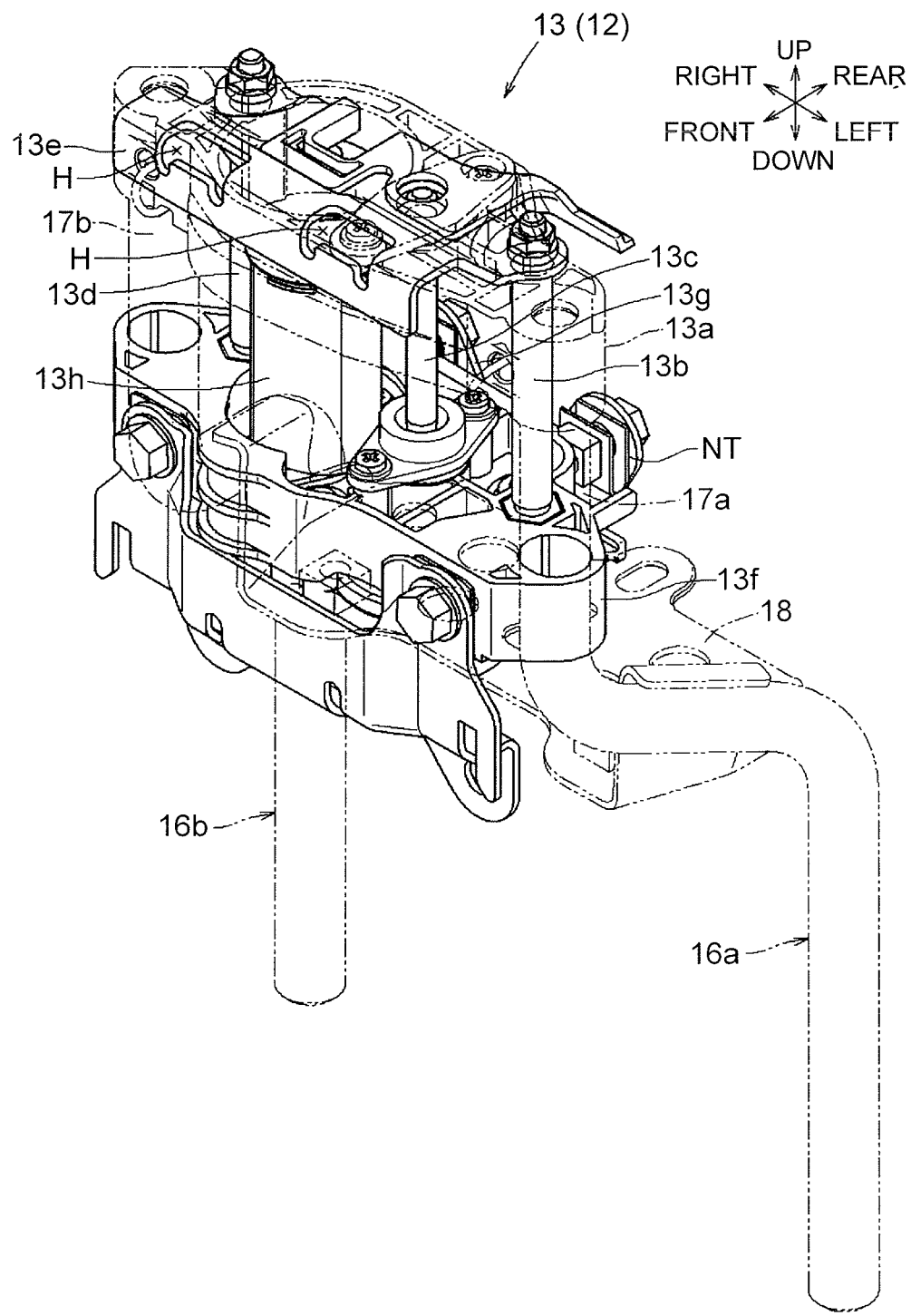
FIG. 7 is a perspective view of a mechanical section with the movable part moved down.
Figure 8:
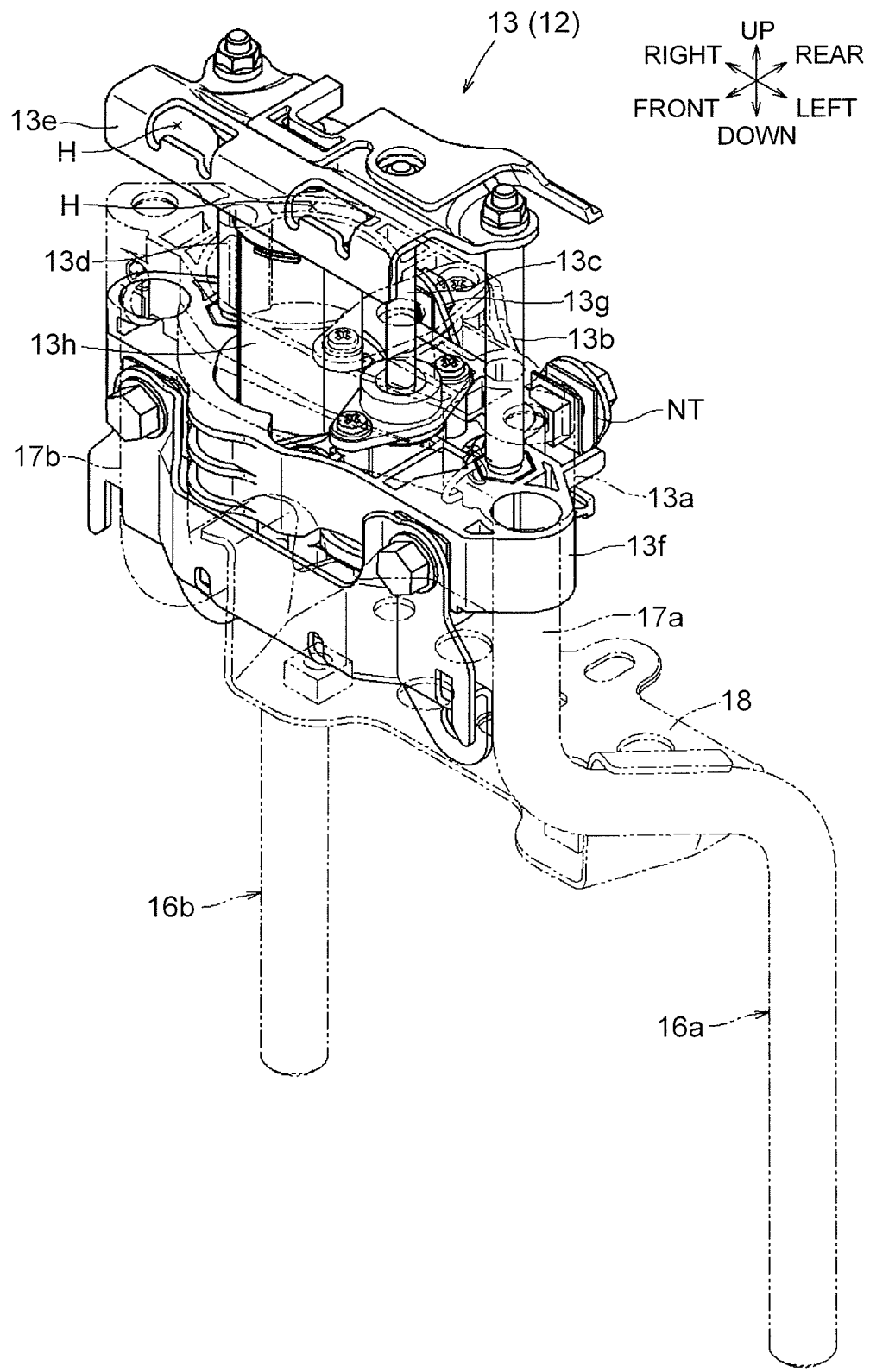
FIG. 8 is a perspective view of the mechanical section with the movable part moved up.

The mechanical section 13 is a substantially rectangular member that moves the movable part 10 up and down. Referring to FIG. 7 and FIG. 8, the mechanical section 13 has a stopper 13a and movable units 13b to 13h (in FIG. 7 and FIG. 8, for convenience, parts corresponding to the movable units are indicated by the solid lines and the other parts of the mechanical section are indicated by the two-dot dashed lines). The stopper 13a is a member that is fixed to upper ends of the left and right guide pins 17a, 17b so as to be unable to move up and down, and is built across the left and right guide pins 17a, 17b. The movable units are parts that move up and down inside the mechanical section 13, and integrally include a plurality of slide shafts 13b to 13d, an upper plate 13e, an up-and-down movement part 13f, the rear plate 13g, and a pillar 13h. The plurality of slide shafts 13b to 13d are rod-like members each extending in the up-down direction, and are disposed at appropriate intervals between the left and right guide pins 17a, 17b. The plurality of slide shafts 13b to 13d are disposed so as to be able to move up and down inside the mechanical section 13, and in this embodiment, are screwed to nuts (not shown) inside the mechanical section 13. Turning the nuts around axes of the slide shafts can move the plurality of slide shafts 13b to 13d up and down synchronously. The upper plate 13e is formed by a plate material having a substantially rectangular shape in a top view, and is fixed to upper ends of the plurality of slide shafts 13b to 13d. The upper plate 13e is provided with a pair of through-holes H, H. Referring to FIG. 6, the corresponding mounting claws 10m, 11m of the insert material 6m can be inserted into and latched on the pair of through-holes H, H.

The up-and-down movement part 13f is a member that is built across the left and right guide pins 17a, 17b under the stopper 13a, and is mounted so as to be slidable in the up-down direction relative to the guide pins 17a, 17b. The up-and-down movement part 13f is fixed to appropriate portions of the plurality of slide shafts 13b to 13d and to the pillar 13h that has a columnar shape and extends in the up-down direction, and as the plurality of slide shafts 13b to 13d move up, the up-and-down movement part 13f can move up until hitting the stopper 13a as shown in FIG. 8. The rear plate 13g that has a plate shape and projects upward on the rear side of the mechanical section 13 is fixed to the up-and-down movement part 13f. Referring to FIG. 6, the bezel 8m of the movable part 10 can be fastened and fixed to the rear plate 13g.

Figure 9:
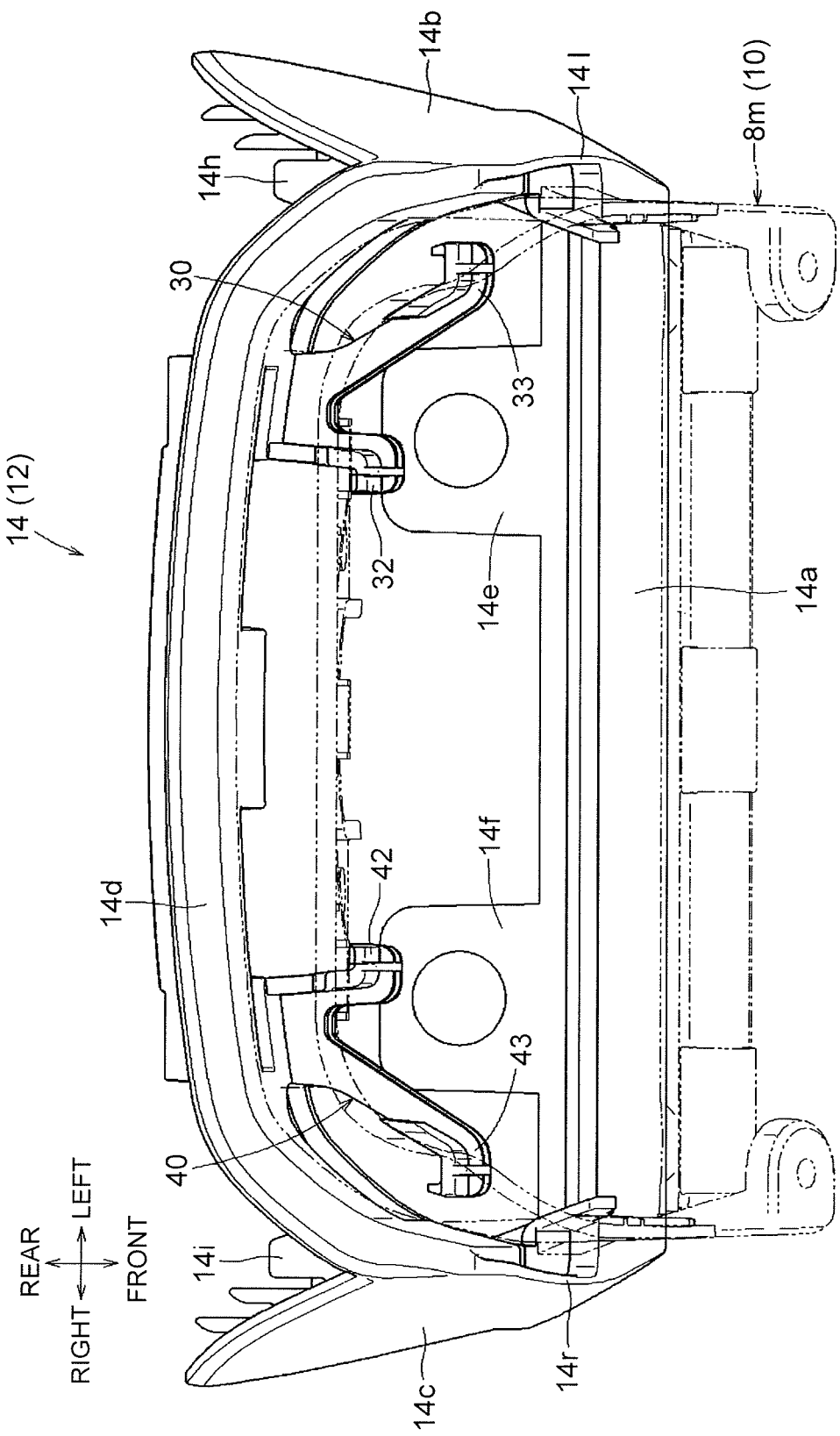
FIG. 9 is a top view of a front cover body.

The front cover body 14 is a member that is disposed around the mechanical section 13. Referring to FIG. 6 and FIG. 9, the front cover body 14 has a front-side part 14a, a left-side part 14b, a right-side part 14c, and a rear-side part 14d. Referring to FIG. 6, the front-side part 14a is a part that has a substantially rectangular shape in a front view and is disposed on the front lower side of the mechanical section 13. At an upper end of a rear surface of the front-side part 14a, a pair of left and right front mounting portions 14e, 14f is provided. The front mounting portions 14e, 14f are flat plate portions having a substantially rectangular shape in a top view, and each protrude rearward from the front-side part 14a. Referring to the retention plate 18 indicated by the broken lines in FIG. 6, the front mounting portions 14e, 14f can be fastened and fixed to the fastening holes H1, H2 on the front side of the retention plate 18.

Referring to FIG. 6, the left-side part 14b is a part that is disposed on the left side of the mechanical section 13, and is elongated upward compared with the front-side part 14a. An upper portion of the left-side part 14b has a substantially triangular shape in a side view and protrudes gradually rearward to a great extent as the upper portion extends from the upper side toward the lower side. Referring to FIG. 2 and FIG. 3, a left front edge 14l of the left-side part 14b is exposed to the outside of the seat in a state where the movable part 10 (to be described later) and the fixed part 12 are mounted, and is disposed adjacent to a left rear edge 10l of the movable part 10. In this embodiment, referring to FIG. 13, the left-side part 14b inclines gradually toward the right side that is the inside of the seat as the left-side part 14b extends frontward, so that the left front edge 14l of the left-side part 14b is disposed on the rightmost side.

Figure 13:
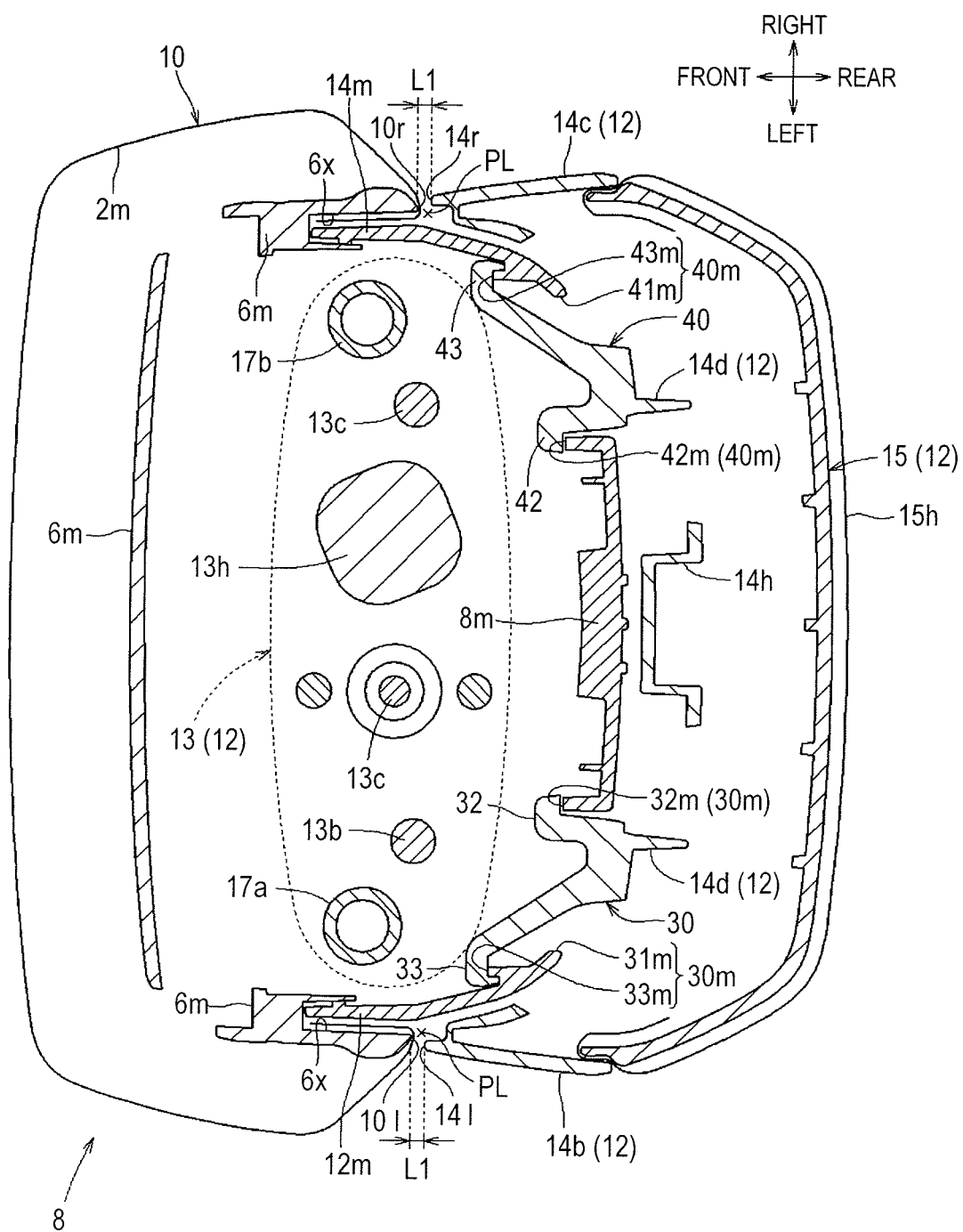
FIG. 13 is a lateral sectional view of the headrest corresponding to a section along line XIII-XIII of FIG. 2.

Referring to FIG. 6, the right-side part 14c is a part that is disposed on the right side of the mechanical section 13, and is disposed so as to be bilaterally symmetric with the left-side part 14b. An upper portion of the right-side part 14c also has a substantially triangular shape in a side view and protrudes gradually rearward to a great extent as the upper portion extends from the upper side toward the lower side. Referring to FIG. 13, a right front edge 14r of the right-side part 14c is also exposed to the outside of the seat in the state where the movable part 10 (to be described later) and the fixed part 12 are mounted, and is disposed adjacent to a right rear edge 10r of the movable part 10. The right-side part 14c inclines gradually toward the left side that is the inside of the seat as the right-side part 14c extends frontward, so that the right front edge 14r of the right-side part 14c is disposed on the leftmost side.

Referring to FIG. 6, the rear-side part 14d is a part that is disposed on the rear side of an upper part of the mechanical section 13, and has the pair of left and right engaging portions 30, 40 (to be described later). As shown in FIG. 9, the rear-side part 14d has a curved shape that is convex rearward along a rear surface of the bezel 8m, and is built across upper portions of the right-side part 14c and the left-side part 14b. Referring to FIG. 6, a lower portion of the rear-side part 14d is cut out substantially in a U-shape in a front view, and a central portion 14g protruding downward is provided at the center in the seat width direction. Referring to FIG. 10, a pair of left and right mounting protrusions 14h, 14i are provided on a rear surface of the rear-side part 14d. The mounting protrusions 14h, 14i are portions that have a rectangular parallelepiped shape and protrude rearward respectively from the left and right sides of the front cover body 14. Openings in rear surfaces of the pair of left and right mounting protrusions 14*h*, 14*i* are disposed at such positions that these openings can face corresponding rear claws 15*d*, 15*e* of the rear cover body 15 (to be described later) shown in FIG. 11.

Referring to FIG. 6 and FIG. 9, the pair of left and right engaging portions 30, 40 are provided on a front surface of the rear-side part 14*d*. Here, as the engaging portions 30, 40 have substantially the same basic configuration, the left engaging portion 30 will be described in detail as an example. Referring to FIG. 9, the left engaging portion 30 is a portion that is substantially Y-shaped in a top view, and is provided at such a position that the engaging portion 30 can be passed through the left pass-through 31*m* of the front cover body 14. The left engaging portion 30 branches into an inner engaging portion 32 and an outer engaging portion 33 at an end while protruding frontward from the rear-side part 14*d*. The inner engaging portion 32 is a flat plate portion that projects toward the right side at a front end of the engaging portion 30, and can engage from the front side with the inner rail part 32*m* of the left rail 30*m*. The outer engaging portion 33 is a flat plate portion that projects toward the left side at the front end of the engaging portion 30, and can engage from the front side with the outer rail part 33*m* of the left rail 30*m*. Similarly, the right engaging portion 40 is provided at such a position that the engaging portion 40 can be passed through the right pass-through 32*m*, and has an inner engaging portion 42 projecting toward the left side and an outer engaging portion 43 projecting toward the right side.

Figure 11:
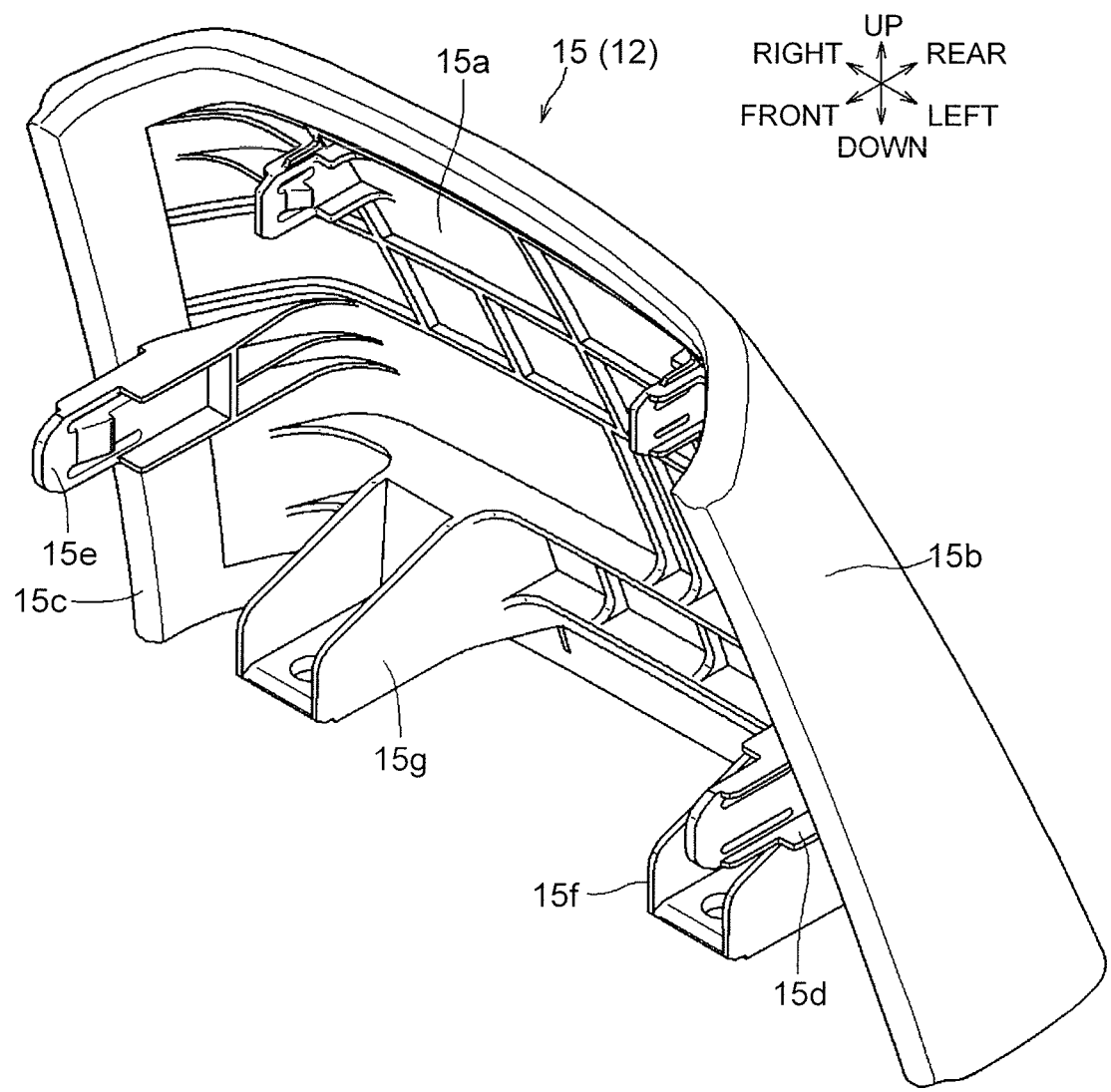
FIG. 11 is a perspective view of the rear cover body.

Referring to FIG. 6, the rear cover body 15 is a plate member having a substantially rectangular shape in a front view, and an outer surface of the rear cover body 15 is covered with a skin material 15*h* shown in FIG. 12. The skin material 15*h* is a facing material that is similar to or the same as the skin 2*m* in color and material. Referring to FIG. 11, the rear cover body 15 integrally has a rear outer wall 15*a* disposed on the rear side of the seat, a left outer wall 15*b* disposed on the left side of the seat, and a right outer wall 15*c* disposed on the right side of the seat. Here, the right outer wall 15*c* is an outer wall that forms the appearance of the right side of the rear cover body 15, and the left outer wall 15*b* is an outer wall that forms the appearance of the left side of the rear cover body 15, and the right outer wall 15*c* and the left outer wall 15*b* are disposed so as to face each other and be bilaterally symmetric with each other. The rear outer wall 15*a* is a substantially rectangular outer wall that forms the appearance of the rear side of the rear cover body 15, and inclines gradually frontward as the rear outer wall 15*a* extends from the lower side toward the upper side. In a lower part of an inner surface of the rear outer wall 15*a*, the pair of left and right rear claws 15*d*, 15*e* and a pair of left and right rear mounting portions 15*f*, 15*g* is provided. The pair of rear claws 15*d*, 15*e* is flat plate portions having a substantially rectangular shape in a side view, and protrude frontward respectively from left and right edges of the rear outer wall 15*a*. The rear claws 15*d*, 15*e* can be passed through and latched on the openings in the rear surfaces of the corresponding mounting protrusions 14*h*, 14*i* of the front cover body 14. The rear mounting portions 15*f*, 15*g* are flat plate portions having a substantially rectangular shape in a top view, and protrude frontward from a lower part of the rear outer wall 15*a*. Referring to the retention plate 18 indicated by the broken lines in FIG. 6, the rear mounting portions 15*f*, 15*g* can be fastened and fixed to the fastening holes H3, H4 on the rear side of the retention plate 18.

Referring to FIG. 6, the movable part 10 is mounted on the side of the movable units provided in the mechanical section 13 of the fixed part 12. In this process, the insert material 6*m* is mounted to the upper plate 13*e* on the front side of the mechanical section 13, and the bezel 8*m* is mounted to the rear plate 13*g* on the rear side of the mechanical section 13. Specifically, the pair of left and right mounting claws 10*m*, 11*m* in an upper part of the insert material 6*m* are inserted into and latched on the corresponding through-holes H, H of the upper plate 13*e*. The mounting plates 22*m*, 23*m* of the bezel 8*m* are fastened and fixed to the rear plate 13*g* through spring nuts NT. Thus, as the movable units 13*b* to 13*h* move up and down inside the mechanical section 13 shown in FIG. 7 and FIG. 8, the movable part 10 moves up and down relative to the fixed part 12 as shown in FIG. 2 and FIG. 3.

Referring to FIG. 6, the mechanical section 13 is inserted from above into the front cover body 14 along with the movable part 10, and the front cover body 14 and the rear cover body 15 are fixed to the mechanical section 13. In this process, referring to the retention plate 18 indicated by the broken lines in FIG. 6, the pair of front mounting portions 14*e*, 14*f* of the front cover body 14 are fastened and fixed with bolt members BM, while bushes BU are interposed, to the fastening holes H1, H2 on the front side of the retention plate 18. While the rear cover body 15 is placed against the rear-side part 14*d* from the rear side, the rear claws 15*d*, 15*e* of the rear cover body 15 are inserted into the corresponding mounting protrusions 14*h*, 14*i* of the front cover body 14 shown in FIG. 10. Referring to the retention plate 18 indicated by the broken lines in FIG. 6, the pair of rear mounting portions 15*f*, 15*g* of the rear cover body 15 are fastened and fixed with the bolt members BM, through the spring nuts NT, to the fastening holes H3, H4 on the rear side of the retention plate 18. Thus, the fixed part 12 can be formed by fixing the front cover body 14 and the rear cover body 15 to the retention plate 18 of the mechanical section 13.

Along with the above work, referring to FIG. 6, the engaging portions 30, 40 of the front cover body 14 are mounted to the corresponding rails 30*m*, 40*m* of the bezel 8*m* so as to be able to move up and down. In this embodiment, while the movable part 10 is inserted from above into the front cover body 14 along with the mechanical section 13, the bezel 8*m* is disposed on the front side of the front cover body 14 as shown in FIG. 9. In this process, the engaging portions 30, 40 of the front cover body 14 shown in FIG. 9 are passed from below through the corresponding pass-throughs 31*m*, 41*m* of the bezel 8*m* shown in FIG. 5. Thus, referring to FIG. 13, in the left engaging portion 30, the inner engaging portion 32 engages with the inner rail part 32*m* from the front side, while the outer engaging portion 33 engages with the outer rail part 33*m* from the front side. Similarly, in the right engaging portion 40, the inner engaging portion 42 engages with the inner rail part 42*m* from the front side, while the outer engaging portion 43 engages with the outer rail part 43*m* from the front side. Thus, the left and right engaging portions 30, 40 engage so as to be able to slide up and down along the corresponding rails 30*m*, 40*m*.

Referring to FIG. 2, with the movable part 10 and the fixed part 12 thus mounted, the movable part 10 is disposed adjacent to the fixed part 12 so as to cover the part of the fixed part 12 from the front side to the upper side. In this state, a rear lower end 10*u* of the movable part 10 is disposed so as to ride on the upper side of the front cover body 14. The left rear edge 10*l* of the movable part 10 is disposed adjacent to the left front edge 14*l* of the front cover body 14 in the front-rear direction. As shown in FIG. 13, the right rear edge 10*r* of the movable part 10 is disposed adjacent to the right front edge 14r of the front cover body 14 in the front-rear direction. Referring to FIG. 2, the partition line PL as a border is formed between the movable part 10 and the fixed part 12, and the partition line PL is visibly exposed to the outside of the seat. Referring to FIG. 3, the movable part 10 moves up relative to the fixed part 12. In this type of configuration, an extreme difference in the width of the partition line PL, for example, between before and after movement of the movable part 10 should be avoided as much as possible from the viewpoint of the design appeal of the seat.

In this embodiment, therefore, referring to FIG. 2, a part of the partition line PL extending along the direction of up-and-down movement of the movable part 10 is formed between the left rear edge 10l of the movable part 10 and the left front edge 14l of the front cover body 14. This part of the partition line PL is provided in a portion where the left rear edge 10l and the left front edge 14l are disposed so as to face each other, and this part is formed in a portion from an upper part E1 of the left front edge 14l to a lower end E2 of the left rear edge 10l. Similarly, on the right side of the seat, as shown in FIG. 13, a part of the partition line PL extending along the direction of up-and-down movement of the movable part 10 is formed between the right rear edge 10r of the movable part 10 and the right front edge 14r of the front cover body 14. The left rear edge 10l and the right rear edge 10r of the movable part 10 function as movable-side edges of the movable part of the present disclosure. The left front edge 14l and the right front edge 14r of the front cover body 14 function as fixed-side edges of the fixed part of the present disclosure. Moreover, referring to FIG. 13, the left rear edge 10l and the left front edge 14l (right rear edge 10r and right front edge 14r) are disposed so as to be separated from each other by a distance L1, and the distance L1 corresponds to the width of the partition line PL.

Referring to FIG. 2 and FIG. 13, the movable part 10 moves relative to the fixed part 12 while keeping a constant clearance between the left rear edge 10l and the left front edge 14l (right rear edge 10r and right front edge 14r). In this embodiment, therefore, the width of a part of the partition line PL remains substantially the same when the movable part 10 moves up and down, so that an extreme difference occurring in the appearance of the seat between before and after movement of the movable part 10 can be avoided as much as possible. Moreover, in this embodiment, referring to FIG. 13, the left rear edge 10l and the left front edge 14l (right rear edge 10r and right front edge 14r) are disposed so as to be separated from each other by the distance L1. Thus, noise caused by contact between the adjacent edges 10l, 14l (10r, 14r) while the movable part 10 is moving up and down can be prevented as much as possible.

In this embodiment, referring to FIG. 13, the left-side part 14b of the front cover body 14 inclines gradually toward the right side that is the inside of the seat as the left-side part 14b extends toward the front side where the movable part 10 is disposed. Similarly, the right-side part 14c inclines gradually toward the left side that is the inside of the seat as the right-side part 14c extends toward the front side where the movable part 10 is disposed. With the left-side part 14b and the right-side part 14c thus provided so as to extend toward the inside of the seat, it is possible to avoid as much as possible that the left front edge 14l and the right front edge 14r become extremely conspicuous at the formation position of the partition line PL, for example, by projecting excessively to the outside of the seat.

Referring to FIG. 6 and FIG. 7, in this embodiment, the movable part 10 is moved up and down by the movable units 13b to 13h of the mechanical section 13. In this process, moving the movable units 13b to 13h up and down along the left and right guide pins 17a, 17b extending in the up-down direction can move the movable part 10 up and down in a proper direction. The engaging portions 30, 40 of the front cover body 14 of the fixed part 12 are engaged in the front-rear direction with the corresponding rails 30m, 40m of the bezel 8m of the movable part 10. Thus, wobbling in the front-rear direction when the movable part 10 moves up and down is prevented or reduced, so that the movable part 10 can be stably moved up and down relative to the fixed part 12.

As has been described above, in this embodiment, the left rear edge 10l as the movable-side edge and the left front edge 14l as the fixed-side edge (right rear edge 10r and right front edge 14r) forming the partition line PL between the movable part 10 and the fixed part 12 are disposed along the direction of movement of the movable part 10. As the movable part 10 moves relative to the fixed part 12 while keeping a constant clearance between the left rear edge 10l and the left front edge 14l (right rear edge 10r and right front edge 14r), no extreme difference occurs in the appearance of the seat between before and after movement of the movable part 10. When a mating direction (mounting direction) of the movable part 10 and the fixed part 12 and a direction in which movement of the movable part 10 is adjusted are thus substantially parallel to each other, a feeling of strangeness evoked by the appearance of the headrest during adjustment of the height of the movable part 10 and before and after adjustment thereof can be avoided as much as possible. According to this embodiment, therefore, it is possible to dispose the movable part 10 and the fixed part 12 adjacent to each other while securing good performance.

In this embodiment, the left-side part 14b and the right-side part 14c of the fixed part 12 extend toward the inside of the seat, which makes it possible to avoid as much as possible that the left front edge 14l and the right front edge 14r become extremely conspicuous at the formation position of the partition line PL. Since the left rear edge 10l and the left front edge 14l (right rear edge 10r and right front edge 14r) are disposed so as to be separated from each other, noise caused by contact between the adjacent edges 10l, 14l (10r, 14r) can be prevented as much as possible. Engagement between the rails 30m, 40m and the engaging portions 30, 40 allows the movable part 10 to move stably in a proper direction along the guide pins 17a, 17b provided in the fixed part 12. Moreover, engagement between the rails 30m, 40m and the engaging portions 30, 40 allows the movable part 10 and the fixed part 12 to be firmly mounted, so that, even in a situation where foreign substances can be caught between the movable part 10 and the fixed part 12, these parts complement each other's rigidity, making it unlikely that any foreign substances are caught therebetween.

The vehicle seat of this embodiment is not limited to the above embodiment but can be realized in various other embodiments. In the above embodiment, the specifications (shapes, dimensions, constituent members, installation positions, number of members, etc.) of the movable part 10 and the fixed part 12 have been illustrated, but this is not intended to limit the specifications of the movable part and the fixed part. For example, the direction of movement of the movable part can be set to an appropriate direction, such as the front-rear direction or the left-right direction, other than the up-down direction. The installation position of the fixed part relative to the movable part can also be set appropriately according to the direction of movement of the movable part. The mechanism for moving the movable part can also be changed appropriately, and the specifications (shapes, dimensions, formation positions, number of members, etc.) of the rails and the engaging portions can also be changed appropriately. For example, in the mechanical section of the fixed part, the guide pins can be formed by members other than the headrest stays, or the guide pins can be omitted as necessary. A plurality of rails or a single rail can be provided on the fixed part side and a corresponding engaging portion can be provided on the movable part side, or the rails and the engaging portions can be omitted as necessary. The formation position of the rail (or engaging portion) can be set at an appropriate position in the bezel, or can be set at an appropriate position in the insert material. The formation position of the engaging portion (or rail) can also be set at an appropriate position in the rear-side part, or in other part of the fixed part than the rear-side part, according to the configuration of the movable part.

In the above embodiment, the specifications (shapes, dimensions, positions, extension directions, etc.) of the movable-side edges (10*l*, 10*r*) and the fixed-side edges (14*l*, 14*r*) have been illustrated, but this is not intended to limit the specifications of these edges. For example, provided that the movable part is allowed to move relative to the fixed part, at least portions of the movable-side edge and the fixed-side edge may be disposed in contact with each other. Moreover, the movable-side edge and the fixed-side edge may be disposed so as to at least partially overlap each other in a thickness direction, and in this case, one of these edges that is exposed to the outside of the seat forms the border between the movable part and the fixed part. Alternatively, the entire partition line may be formed by the movable-side edge and the fixed-side edge.

In the above embodiment, the example in which the left-side part 14*b* and the right-side part 14*c* of the fixed part 12 extend gradually toward the inside of the seat as these parts approach the movable part 10 has been described. This configuration may be modified so that conversely the movable part extends gradually toward the inside of the seat as the movable part approaches the fixed part, or so that both the movable part and the fixed part extend toward the inside of the seat from appropriate positions. Alternatively, unless the appearance of the seat is extremely deteriorated, at least one of the movable part and the fixed part can be extended toward the outside of the seat.

In the above embodiment, the headrest 8 has been illustrated as a member having the movable part and the fixed part, but this is not intended to limit the type of member having the movable part and the fixed part. Various members disposed in a vehicle seat are conceivable as this type of member. Moreover, the configuration of the vehicle seat 2 can also be changed appropriately. The configuration of the above embodiment is applicable to various types of vehicle seats that are installed in vehicles such as automobiles, airplanes, and trains.

What is claimed is:
1. A vehicle seat comprising:
a seat cushion;
a seatback; and
a headrest, wherein
at least one of the seat cushion, the seatback, and the headrest includes a fixed part and a movable part,
wherein the fixed part and the movable part are provided adjacent to each other, and wherein the movable part is mounted so as to be movable relative to the fixed part, and a border between the movable part and the fixed part is exposed to an outside of the seat,
a movable-side edge of the movable part and a fixed-side edge of the fixed part are disposed adjacent to each other along a direction of movement of the movable part so as to form at least a part of the border exposed to the outside of the seat,
the movable part moves relative to the fixed part while keeping a constant clearance between the movable-side edge and the fixed-side edge, wherein
at least one of the movable-side edge and the fixed-side edge are provided on a front face of an inclined wall surface of at least one of the fixed part and the movable part,
the inclined wall surface extending at an incline with respect to a plane defined by the border between the movable part and the fixed part,
wherein one of the fixed part and the movable part has a rail that extends in the direction of movement of the movable part, and the other of the fixed part and the movable part has an engaging portion that engages with the rail so as to be slidable in the direction of movement of the movable part, and
wherein the inclined wall surface protrudes beyond a lateral exterior edge of the rail so as to fully conceal the rail within the headrest.

2. The vehicle seat according to claim 1, wherein the movable-side edge and the fixed-side edge are disposed so as to be separated from each other.

3. The vehicle seat according to claim 1, wherein
the fixed part has a guide pin that extends in the direction of movement of the movable part, and the movable part is mounted to the fixed part so as to be movable along the guide pin, and
the movable part moves along the guide pin with the engaging portion engaged with the rail.

4. The vehicle seat according to claim 1, wherein the inclined wall surface is inclined inwardly in a direction extending from a first end of the inclined wall surface towards a second end of the inclined wall surface, the second end of the inclined wall surface defining the front face of the inclined wall surface that is provided with the at least one of the movable-side edge and the fixed-side edge.

\* \* \* \* \*